United States Patent [19]

Alvino

[11] Patent Number: 4,781,986
[45] Date of Patent: Nov. 1, 1988

[54] ADHESIVE, BONDING METHOD EMPLOYING SAME, AND PRODUCT PRODUCED THEREBY

[75] Inventor: William M. Alvino, Indiana Township, Allegheny County, Pa.

[73] Assignee: Westinghouse Electric Corp., Pittsburgh, Pa.

[21] Appl. No.: 79,075

[22] Filed: Jul. 29, 1987

[51] Int. Cl.$^4$ .......................... B32B 27/00; C09J 3/14
[52] U.S. Cl. .............................. 428/423.7; 156/331.7; 524/315; 528/54; 528/67
[58] Field of Search ................. 156/331.7; 428/423.7; 524/315; 528/54, 67

[56] References Cited

U.S. PATENT DOCUMENTS

| | | | |
|---|---|---|---|
| 3,487,050 | 12/1969 | Castro et al. | 528/54 |
| 3,490,987 | 1/1970 | Bauriedel | 428/423.7 |
| 3,706,710 | 12/1972 | Camilleri et al. | 524/315 |

FOREIGN PATENT DOCUMENTS 2032284 12/1971 Fed. Rep. of Germany ...... 524/315

Primary Examiner—John J. Gallagher
Attorney, Agent, or Firm—Joyce L. Morrison; Richard D. Fuerle

[57] ABSTRACT

Disclosed is a method of making an adhesive comprising forming a first composition of a polyesterether glycol having the general formula

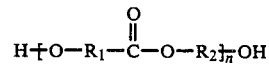

where $R_1$ and $R_2$ are each independently selected from alkylidene from $C_1$ to $C_{10}$, and n is about 1 to about 5 about 0.01 to about 1% by weight (based on the weight of the polyesterether glycol) of a catalyst, and sufficient solvent for said adhesive to have at least 50% solids, forming a second composition of about 0.85 to about 0.95 mole % of a diisocyanate and about 0.15 to about 0.05 mole % of a polyisocyanate, and mixing the first and second compositions together. The adhesive is applied to a first substrate, the solvent is evaporated, and a second substrate is pressed against the adhesive on the first substrate to form a flexible laminate.

20 Claims, No Drawings

ADHESIVE, BONDING METHOD EMPLOYING SAME, AND PRODUCT PRODUCED THEREBY

BACKGROUND OF THE INVENTION

In making flexible laminates for use as slot liners in motors and generators, an adhesive is applied to a continuously moving film, and that film is joined to a second continuously moving sheet to form the laminate. Commercial adhesives that are used for this application are low solids (about 20%) and do not meet the federal guidelines for the emission of volatile organic compounds. The adhesives also have poor green strength which permits the films being laminated to move after they are joined, resulting in wrinkles or other flaws in the laminate. In addition, once the laminate is formed, more than five days are required to cure the adhesive, using up storage space and increasing inventory costs.

SUMMARY OF THE INVENTION

We have discovered that an adhesive having excellent properties can be prepared from relatively inexpensive materials—a polyesterether glycol, a diisocyanate, and a polyisocyanate. The adhesive of this invention is prepared as two components which are then combined when they are to be applied to a substrate. The two components of the adhesive are each stable for at least several weeks, and, when combined, the resulting adhesive sets up rapidly enough to give good green strength but not so rapidly that it cannot be applied to the substrates without difficulty. Because the adhesive of this invention has high solids, much less solvent is emitted during cure, permitting the adhesive to meet federal guidelines for volatile organic emissions. The adhesive cures in less than one day at room temperature, significantly reducing the amount of space required for curing and the inventory costs. The resulting laminate has excellent bond strength, even with materials that are usually difficult to bond to.

RELEVANT ART

U.S. Pat. No. 4,098,747 describes an adhesive made by combining a diisocyanate, an ε-caprolactone diol and an alkane diol chain lengthener. A trifunctional isocyanate is normally used to insure sufficient crosslinking.

DESCRIPTION OF THE INVENTION

The adhesive of this invention is prepared from five components: a polyesterether glycol, a diisocyanate, a polyisocyanate, a solvent, and a catalyst. The polyesterether glycol has the general formula:

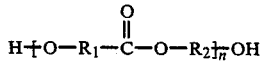

where $R_1$ and $R_2$ are each independently selected from alkylidene from $C_1$ to $C_{10}$ and n is about 1 to about 5. It is preferable for $R_1$ to be alkylidene from $C_4$ to $C_6$ and $R_2$ to be alkylidene from $C_1$ to $C_3$ as those polyesterether glycols have produced adhesives having the best properties. The polyesterether glycols are commercially available or can be prepared, for example, by reacting caprolactone with ethylene glycol. The polyesterether glycols should have a molecular weight of about 100 to about 700 as lower molecular weight polyesterether glycols may result in undesirable properties, and polyesterether glycols that have higher molecular weights may be difficult to dissolve; a preferred molecular weight range is about 400 to about 600. The polyesterether glycol should have a hydroxyl number of about 200 to about 225 as polyesterether glycols that have higher hydroxyl numbers tend to produce adhesives that are too brittle, and polyesterether glycols that have lower hydroxyl numbers may produce adhesives that are too soft.

The diisocyanate used in preparing the adhesive of this invention is a compound, which may be a polymeric compound, that has two isocyanate groups. The diisocyanate can be described by the general formula: OCN—R—NCO where R is alkyl, aryl, cycloaliphatic, aliphatic, aralkyl, alkaryl, or other divalent radical. Aromatic diisocyanates are preferred as they produce adhesives having better thermal properties. The diisocyanate must be capable of being dissolved in a solvent to form a solution. The preferred diisocyanate is a light yellow low viscosity modified 4,4'-diphenyl methane diisocyanate sold by Upjohn Chemical Co. under the designation "143L". Other suitable diisocyanates include:

meta-phenylene diisocyanate
tolylene diisocyanate
dimethyl 3,3'-diisocyanato 4,4'-diphenylene
dimethoxy 3,3'-diisocyanato 4,4'-diphenylene
meta-xylylene diisocyanate
para-xylylene diisocyanate
diisocyanato 4,4'-dicyclohexyl methane
hexamethylene diisocyanate
dodeca-methylene diisocyanate
diisocyanato 2,11-dodecane
bis(para-phenylene isocyanate oxadiazole-1,3,4)paraphenylene
bis(para-phenylene isocyanate)oxidiazole-1,3,4
bis(meta-phenylene isocyanate)oxadiazole-1,3,4
bis(meta-phenylene isocyanate) 4-phenyl triazole-1,2,4
bis(4-paraphenylene isocyanate thiazole 2-yl)metaphenylene
(2-phenylene)benzimidazole 5,4'-diisocyanate
(2-phenylene)benzoxazole 5,4'-diisocyanate
(2-phenylene)benzothiazole 6,4'-diisocyanate
bis(2-phenylene isocyanate benzimidazole 6-yl) 2,5-oxadiazole-1,3,4
bis(para-phenylene isocyanate 2-benzimidazole 6-yl)
bis(para-phenylene isocyanate 2-benzoxazole 6-yl)
4,4'-diisocyanato diphenyl 2,2-propane
4,4'-diisocyanato diphenyl methane
4,4'-diisocyanato benzidine
4,4'-diisocyanato diphenyl sulfur
4,4'-diisocyanato diphenyl sulfone
4,4'-diisocyanato diphenyl ether
4,4'-diisocyanato diphenyl 1,1-cyclohexane
oxides of methyl- and of bis(meta-isocyanato-phenyl)-phosphine
diisocyanato 1,5-naphthalene.

The polyisocyanate used in making the adhesive of this invention is a polymeric compound having at least three isocyanate groups. Examples of suitable polyisocyanates include the reaction product of toluene diisocyanate and trimethylol propane, a polyisocyanate based on cycloaliphatic isophorone diisocyanate (sold by Huls as "IPDI-T1890"), and a polymethylene polyphenylisocyanate (sold by Upjohn as "PAPI27").

The preferred polyisocyanate is a polymer of trimethylol propane and toluene diisocyanate. The polyisocyanate also must be soluble in a solvent so that a solution can be produced.

The solvent used in preparing the adhesive of this invention must be capable of dissolving the polyesterether glycol, the diisocyanate, and the polyisocyanate. The solvent should preferably have a boiling point between about 60° and about 120° C. as lower boiling solvents are too volatile and higher boiling solvents are too difficult to volatilize. A preferred solvent is ethyl acetate as it is easily volatilized, inexpensive, and it is a good solvent for the solid components of the adhesive. A wide variety of other solvents can be used including mono- and di-alkyl ethers of ethylene glycol and their derivatives (sold as "Cellosolve"), mono- and di-alkyl ethers of diethylene glycol and their derivatives (sold as "Carbitol"), and other esters such as butyl acetate, methyl acetate, and propyl acetate. Small amounts of liquids that are not especially good solvents can also be included as diluents, such as toluene and ketones such as, for example, methyl ethyl ketone.

A wide variety of catalysts can be used to catalyze the reaction between the polyesterether glycol and the isocyanates. Examples of suitable catalysts include benzyl dimethyl amine; 1,8-diaza-bicyclo(5,4,0)undecene-7 (triethylene diamine) (DBU); 51% DBU plus 2-ethylhexanoic acid; DBU plus phenol; tertiary amines; tertiary amine salts; quaternary ammonium salts; n-methyl morpholine; zinc compounds; 1-methyl imidazole; 2-methyl imidazole; dimethyl formamide; triethylamine; N-methyl pyrrolidone; titanium acetyl acetonate chelate; titanium triethanolamine chelate; titanium ethyl acetoacetate chelate; organotin compounds such as dibutyl tin dilaurate; alkyl tin mercaptides; and metallic soap tin compounds. The preferred catalysts are the 2-ethylhexoate salt of 1,8-diaza-bicyclo(5,4,0)undecene-7 (triethylene diamine) and a mixture of 1,8-diaza-bicyclo(5,4,0)undecene-7 (triethylene diamine) and phenol because these catasysts cure the adhesive at about the right speed, neither too fast nor too slow.

The components of the adhesive are used in the adhesive in approximately stoichiometric proportions, i.e., to provide one hydroxyl group for each isocyanate group. Of the isocyanates, about 0.85 to about 0.95 moles % should be diisocyanate and about 0.15 to about 0.05 moles % should be polyisocyanate. Sufficient solvent should be included so that the solids content of the adhesive is greater than 50%. About 0.01 to about 1% by weight catalyst (based on weight of polyester ether) is also included. A preferred proportion is about 0.9 mole % of the diisocyanate to about 0.1 mole % of the polyisocyanate, sufficient solvent to give a solids content of greater than 70%, and about 0.05 to about 0.15% by weight catalyst (based on weight of polyesterether glycol). The adhesive may also include other components such as fillers and dyes, as is known to those skilled in the art.

The adhesive is prepared as two separate components which are combined at the time of use. The first component consists of the polyesterether glycol and the catalyst dissolved in the solvent. No reaction occurs and this component is stable for about 8 weeks. The second component consists of a mixture of the diisocyanate and the polyisocyanate. Again, no reaction occurs and this component is stable for about 3 weeks. When it is desired to use adhesive, the two components are mixed. The mixture begins to react, but is stable for about 40 minutes. The reaction is between the isocyanate group (on the diisocyanate and the polyisocyanate) and the hydroxyl groups (on the polyesterether glycol); a polyurethane is formed:

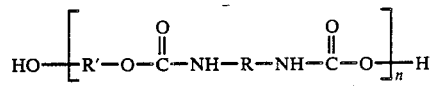

The mixture is applied to one of the substrates and the solvent is driven off by heating the adhesive to a temperature greater than the boiling point of the solvent. A second substrate is then pressed against the adhesive to form the laminate. If films are being joined this can conveniently be accomplished using a hot nip roll at a temperature of about room temperature to about 150° C., and preferably at about 100° to 120° C. The resulting composite is then stored for about a day at room temperature to complete the cure. Cure time can be reduced, of course, by storing the composite at higher temperatures.

Attempts to prepare the adhesive by other procedures did not result in an adhesive having good properties. For example, if the polyesterether glycol and the diisocyanate are dissolved in the solvent and are reacted at a temperature below 50° C. for less than 20 minutes and then combined with a separately prepared mixture of the polyisocyanate and the catalysts, the solution of the polyesterether glycol and diisocyanate in the solvent does not have good shelf life. In an alternative procedure, the polyesterether glycol, diisocyanate, and polyisocyanate, were mixed with the solvent and were reacted at about 60° C. and cooled without using a catalyst. However, the resulting adhesive had too high a viscosity to be useful for most purposes.

The adhesive may be used to join virtually any two kinds of substrates by simply applying it to one substrate, removing the solvent, and pressing the other substrate against the adhesive. Suitable substrates include, for example, webs of paper, plastic, metallized films, textiles, foams, fiberglass, and various metal foils. Various types of paper can be used including rag, asbestos, kraft paper, as well as film of materials such as "Nomex" (an aromatic polyamide paper sold by Dupont), "Dacron" (a polyethylene terephthalate fabric sold by Dupont), a "Kapton" (a polyimide film sold by Dupont). It is particularly useful for joining "Mylar" (a polyethylene terephthalate film sold by Dupont) to paper, "Kapton film", or "Dacron" mat for use in making slot liners for motors or generators.

A typical procedure would be to meter the freshly prepared adhesive onto a continuously moving "Mylar" film, passing the film between rollers to remove excess adhesive, then through an oven to remove the solvent and B-stage the adhesive. The film is then joined with another sheet of film or paper moving at the same speed and the two sheets are passed between heated nip rolls to form the flexible laminate. The "Mylar" can also be coated by passing it over a counterrotating roller partially immersed in the adhesive. Other techniques for applying the adhesive to various substrates are well within the skill of those in the art.

The following examples further illustrate this invention.

EXAMPLE 1

First, 26.1 grams (0.1 equivalence) of a polyesterether glycol based on the reaction of caprolactone and ethylene glycol, having a hydroxyl no. of 212 and a hydroxyl equivalent of 264, supplied by Union Carbide Corporation under the designation "TONE 0200," was dissolved in 10.65 grams of urethane grade ethyl acetate. A clear colorless solution was obtained at 30° to 40° C.

Then 11.25 gms (0.09 equivalents) of modified 4,4'-diphenyl methane diisocyanate (MDI) (Upjohn's "143L") was added to the solution at 40° C. An exothermic reaction occurred and the temperature was maintained between 40° and 45° C. by means of an ice bath. After five minutes, a clear pale yellow solution was obtained which was cooled immediately to less than 20° C. with an ice bath. The viscosity of the solution was about 50 cps.

430 gms (0.01 equivalents) of an adduct of trimethylol propane and toluene diisocyanate at 75% solids and ethyl acetate having an equivalent weight of 232 supplied by Mobay Chemical Company under the designation "CB-75" was dissolved in 5.69 gms of ethyl acetate. Then 0.02 gms (0.05% based on total solids of adhesive formulation) of various catalysts were added and mixed in at room temperature. The two separate solutions were mixed together at room temperature to give a pale yellow clear solution with a viscosity of about 60 cps and a solids content of 70%. The ratio of the first solution to the second was 4.8 to 1.0.

In order to evaluate the effectiveness of the catalyzed adhesive formulation and provide high green strength, hand laminated samples (8 ins. × 10 ins.) were prepared. A thin layer of adhesive was applied (<0.002 ins.) to a "Mylar" substrate, and the adhesive was B-staged in an oven at 130° C. for various times to provide a slightly tacky surface. Other materials, such as rag and kraft paper, "Nomex," "Dacron," and "Kapton," were laminated in a nip roll at 130° C. to the B-staged adhesive on the "Mylar." After cooling to room temperature, the laminates were peeled apart by hand to get a measure of the green strength. The results of these tests are given in the following table.

| Catalyst in Adhesive | "B" Stage Time at 130° C. (Sec) | Green Strength |
|---|---|---|
| DBU + Phenol | 2–3 | Good to excellent |
| 51% DBU + 2-ethylhexanoic acid | 4–6 | Good to excellent |
| alkyl tin mercaptide | 3–5 | Fair to good |
| organotin compound | 5–7 | Good to excellent |
| titanium ethyl acetoacetate chelate | 7–10 | Good |
| titanium triethanolamine chelate | 10–12 | Fair |
| titanium cetyl acetonate chelate | 4–6 | Good |
| dibutyl tin | 3–5 | Good to excellent |

Good to excellent green strength indicates that the fiber surface tore when the laminate was peeled apart. The above table shows that the two DBU catalysts produced the best green strength. Dibutyl tin also produced good to excellent green strength but cured the adhesive too rapidly to be useful for some applications.

EXAMPLE 2

Example 1 was repeated using different ratios of ingredients. The following table gives the ratios used and the resulting viscosity of the adhesive.

| Formulation Number | Moles of Ingredient | | | Solids (%) | Viscosity (cps) |
|---|---|---|---|---|---|
| | "TONE 0200" | MDI | "CB-75" | | |
| 1 | 1.0 | 0.9 | 0.1 | 65 | 85 |
| 2 | 1.0 | 0.75 | 0.25 | 65 | — |
| 3 | 1.0 | 0.50 | 0.50 | 65 | 65 |
| 4 | 1.0 | 0.25 | 0.75 | 65 | 140 |

The above table shows that the formulations that contained 0.25 moles or more of "CB-75" did not provide adequate green strength. Laminates made from formulations 2, 3, and 4 in the above table exhibited break and run properties when peeled apart and were not satisfactory.

EXAMPLE 3

This example illustrates the preferred method of preparing an adhesive of this invention. The following table gives the materials used and the amounts.

| Material | Equiv. Wt. | Ratio | Amount | Wt. % | Total Solids |
|---|---|---|---|---|---|
| Polyesterether glycol | 261 | 1.0 | 26.1 | 50.49 | |
| MDI | 143 | 0.9 | 12.87 | 24.89 | 82% |
| "CB-75" | 323 | 0.1 | 4.30 | 8.31 | |
| Ethyl Acetate | — | | 8.22 | 15.9 | |
| "SA-102"* | — | | 0.02 | 0.038 | |

Total Solids = 26.1 + 12.87 + (4.30 × 0.75) + 0.02 ÷ 51.51 × 100.
Catalyst Concentration = 0.0766% × 26.1
Amount = Eq. wt. × ratio ÷ 10.
*51% DBU + 2-ethylhexanoic acid (2-ethylhexoate salt of DBU), supplied by Abbott Laboratories.

The adhesive was prepared in three parts.

| | Part A | Part B | Part C |
|---|---|---|---|
| Solids (%) = | 76 | 93 | 82 |
| Viscosity (cps) = | 27 | 50 | 60 |
| Density (g/cc) = | 1.0448 | 1.1978 | 1.105 |
| (#/gal) = | 8.718 | 9.995 | 9.221 |
| Shelf Life = | 8 weeks | 3 weeks | 40 mins |

A number of polyesterether glycols obtained from Union Carbide and their properties are given in the following table.

| Material | Hydroxyl Number | Molecular Weight | Hydroxyl Equiv. |
|---|---|---|---|
| "Tone 0200" | 212 | 530 | 264 |
| "Tone 0210" | 139 | 830 | 403 |
| "Tone 0230" | 91 | 1,250 | 619 |
| "Tone 0240" | 56 | 2,000 | 1,003 |

Adhesive formulations were prepared by dissolving MDI and "CB-75" in ethyl acetate at 40° C. A polyesterether glycol was added and the mixture was stored for about 30 minutes until a clear solution was obtained. The solution was cooled to room temperature and was applied to "Mylar" using a "Mayer" rod to obtain a thin coating (0.5 mils) of adhesive. The adhesive coated "Mylar" was placed in an oven at 150° C. for various times (30–180 secs) to remove solvent. "Nomex" was joined to the "Mylar" in a heated nip roll (125° C.). The laminate was pulled apart by hand to determine its bond strength. The adhesive formulations are given in the following table.

| ADHESIVE FORMULATIONS | | | | |
| --- | --- | --- | --- | --- |
| | Formulation No. | | | |
| Ingredient | 1 | 2 | 3 | 4 |
| "Tone 0200" | 25 | | | |
| "Tone 0210" | | 25 | | |
| "Tone 0230" | | | 25 | |
| "Tone 0240" | | | | 25 |
| MDI | 10.37 | 6.96 | 4.53 | 2.80 |
| "CB-75" | 3.97 | 2.66 | 1.73 | 1.07 |
| Ethyl Acetate | 17.24 | 15.32 | 14.07 | 13.19 |

The bonds strengths of the laminates are given in the following Table.

| Formulation | "B" Stage Time At 150° C., Sec. | Bond Strength After Nip Roll Lamination |
| --- | --- | --- |
| 1 | 30 | Poor |
| | 60 | Fair |
| | 90 | Excellent-Nomex tares when peeling apart |
| | 120 | Poor-break and run characteristics |
| 2 | 30 | Poor-no bond |
| | 60 | Poor-no bond |
| | 90 | Poor-no bond |
| | 120 | Poor-no bond |
| 3 | 30 | Poor-no bond |
| | 60 | Poor-no bond |
| | 90 | Poor-no bond |
| | 120 | Poor-no bond |
| 4 | 30 | Poor-no bond |
| | 60 | Poor-no bond |
| | 90 | Poor-no bond |
| | 120 | Poor-no bond |

The above table shows that only formulation 1 produced adequate bond strength, and that a B-stage time at 150° C. of about 90 seconds produced the best bond strength.

I claim:

1. A method of making an adhesive comprising:
   (1) preparing a first composition which comprises a solution in an organic solvent of a polyesterether glycol having the general formula $$H\!\!-\!\!\!\left[\!O\!-\!R_1\!-\!\overset{\overset{\displaystyle O}{\|}}{C}\!-\!O\!-\!R_2\!\right]_{\!n}\!\!\!-\!OH$$

where $R_1$ and $R_2$ are each independently selected from alkylidene from $C_1$ to $C_{10}$ and n is about 1 to about 5, and where said polyesterether glycol has a molecular weight of about 100 to about 700 and a hydroxyl number of about 200 to about 255,
   (2) preparing a second composition which comprises,
      (A) about 0.85 to about 0.95 mole % of a diisocyanate soluble in said solvent; and
      (B) about 0.15 to about 0.05 mole % of a polyisocyanate having at least three isocyanate groups; and
   (3) mixing together approximately stoichiometric proportions of said first and second compositions to form said adhesive.

2. A method according to claim 1 including the additional step of applying said adhesive to a substrate.
3. A method according to claim 2 wherein said substrate is polyethylene terephthalate.
4. A method according to claim 2 including the additional step of evaporating said solvent and pressing a second substrate against said adhesive on said first substrate to make a flexible laminate.
5. A method according to claim 4 wherein said second substrate is selected from the group consisting of paper and film.
6. A method according to claim 4 wherein said flexible laminate is cut into slot liners.
7. A method according to claim 1 wherein $R_1$ is alkylidene from $C_4$ to $C_6$ and $R_2$ is alkylidene from $C_1$ to $C_3$.
8. A method according to claim 1 wherein the molecular weight of said polyesterether glycol is about 400 and about 600.
9. A method according to claim 1 wherein said diisocyanate is aromatic.
10. A method according to claim 1 wherein said solvent has a boiling point of about 60 to about 120.
11. A method according to claim 1 wherein said solvent is ethyl acetate.
12. A method according to claim 1 wherein including a catalyst comprising 1,8-diaza-bicyclo(5,4,0)undecene-7 (triethylene diamine).
13. An adhesive made according to the method of claim 1.
14. A flexible laminate made according to the method of claim 4.
15. A method of making an adhesive comprising:
    (1) preparing a first composition which comprises,
       (A) a polyesterether glycol having the general formula $$H\!\!-\!\!\!\left[\!O\!-\!R_1\!-\!\overset{\overset{\displaystyle O}{\|}}{C}\!-\!O\!-\!R_2\!\right]_{\!n}\!\!\!-\!OH$$

where $R_1$ is alkylidene from $C_4$ to $C_6$, $R_2$ is alkylidene from $C_1$ to $C_3$, and n is about 1 to about 5;
       (B) sufficient solvent to form a solution of at least 50% by weight solids;
       (C) about 0.05 to about 0.15% by weight (based on weight of said polyester ether) of a catalyst;
    (2) preparing a second composition which comprises
       (A) about 0.85 to about 0.95 mole % of an aromatic diisocyanate; and
       (B) about 0.15 to about 0.05 mole % of a polyisocyanate having three or more isocyanate groups; and
    (3) mixing approximately stoichiometric proportions of said first and second compositions to form said adhesive.
16. A method according to claim 15 wherein the mole % of said diisocyanate is about 0.9 and the mole % of said polyisocyanate is about 0.1.
17. An adhesive made according to the method of claim 16.
18. A method according to claim 16 including the additional steps of applying said adhesive to a first substrate, evaporating said solvent, and pressing a second substrate against said adhesive on said first substrate to form a flexible laminate.
19. A flexible laminate made according to the method of claim 18.
20. An adhesive comprising an admixture of (1) a first composition which comprises a solution in an organic solvent of a polyesterether glycol having the general formula

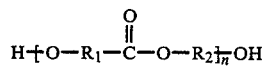

where $R_1$ and $R_2$ are each independently selected from alkylidene from $C_1$ to $C_{10}$ and n is about 1 to about 5, and where said polyesterether glycol has a molecular weight of about 100 to about 700 and a hydroxyl number of about 200 to about 225, (2) a second composition which comprises,
 (A) about 0.85 to about 0.95 mole % of a diisocyanate soluble in said solvent; and
 (B) about 0.15 to about 0.05 mole % of a polyisocyanate having at least three isocyanate groups.

* * * * *